April 21, 1931.                B. O. BRISCOE                1,801,538
                              INCENSE BURNER
                           Filed April 25, 1927

Inventor,
Bertram O. Briscoe.

Patented Apr. 21, 1931

1,801,538

UNITED STATES PATENT OFFICE

BERTRAM O. BRISCOE, OF CHICAGO, ILLINOIS

INCENSE BURNER

Application filed April 25, 1927. Serial No. 186,412.

This invention relates particularly to incense burners and the like. One of the primary objects is to provide a means of igniting and consuming incense and other consumable material placed therein.

The invention in the accompanying drawings is embodied in a receptacle into which is secured an electrical heating unit.

It is to be understood that, although the invention is here shown as applied particularly to burning incense, it may be used for burning medical powders, smudges, and the like. By the use of my invention, material may be easily and readily ignited and kept burning even though it is not readily combustible. In fact, substances not usually regarded as combustible may be burned. It will be seen, therefore, that by the use of my invention it is possible to burn incense, powders, and the like, which are not readily combustible because of dampness or from other causes and therefore cannot be burned in the ordinary receptacle. Cheap, imperfect, damp, musty and deteriorated powders may be readily consumed in my improved receptacle.

Figure 1:
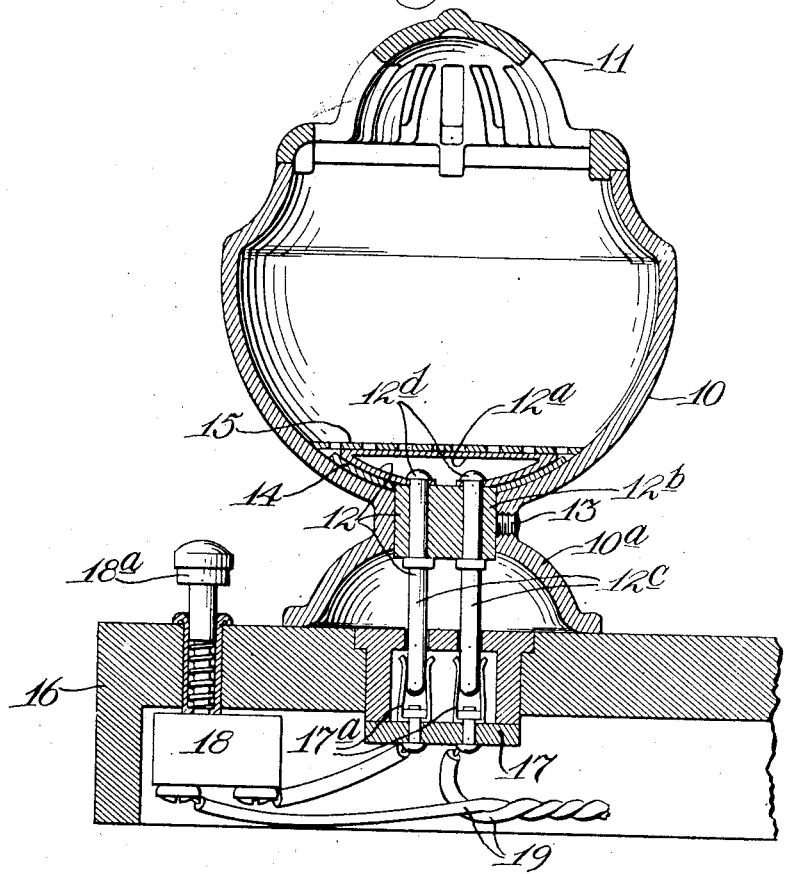
Figure 2:
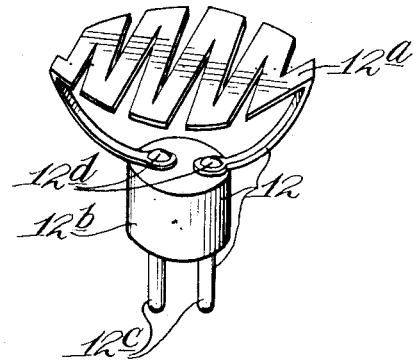

Referring to the accompanying drawings—Figure 1 is a vertical section of a device embodying my invention, and Fig. 2 is a view of the electrical heating unit, forming a part of the same.

In Fig. 1, 10 represents a receptacle of any suitable construction, having a flanged base 10ª and preferably provided with a perforated cover 11. In the base of the receptacle is a hole into which is fitted the unit 12, secured by a set screw 13. The unit 12 is provided at its top with an electrical heating element 12ª comprising a resistance wire or metal element which becomes heated by passage of an electrical current. 12ᵇ is a mounting for the heating element, made preferably of procelain, or other resistant insulating material, through which extend contact spears 12ᶜ. The upper ends of the spears 12ᶜ may be riveted to the terminals of the heating element 12ª at 12ᵈ.

In assembling the device a round washer of asbestos insulation, 14, is placed under the heating element and a removable perforated non-combustible disk or grid 15 is preferably placed over the element. A perforated disk of mica is suitable. The purpose of the grid 15 is to prevent the powders from baking on the element 12ª and yet to permit enough to fall through the perforations to ignite.

The receptacle assembly above described is made detachable from a support, which may be a table, pedestal or a part of the woodwork as shown at 16, to facilitate the emptying of ashes from same. Within support 16 is mounted a standard electrical socket 17, provided with contact clips 17ª, into which fit the contact spears 12ᶜ making electrical contact therewith.

In support 16 is also mounted an electrical switch 18. This switch may be of any suitable construction, but is preferably such that contact is made only while the push button 18ª is being pressed down.

The electric wires 19 are connected in a known manner through the switch and to the electrical heating element. Material to be burned is placed in receptacle 10, push button 18ª is pressed down for a few moments then released. This causes the heating element to become hot thereby igniting the incense or other powder. In case of powders not readily combustible the element may be maintained heated to assist combustion.

The foregoing detailed description has been given for clearness of understanding only and no unnecessary limitations should be understood therefrom, but the appended claims should be construed as broadly as possible.

I claim:

1. A device of the character described comprising; a receptacle adapted to contain material to be burned; an electrical heating unit in the bottom of said receptacle; and a non-combustible grid arranged over said heating unit, said grid adapted to support the bulk of the material in the receptacle to prevent baking and permit a portion thereof to fall through the interstices of said grid onto the electrical heating unit to become ignited thereby.

2. A device of the character described comprising; a receptacle adapted to contain material to be burned; an electrical heating unit arranged in the bottom of said receptacle; a pair of contact spears projecting from bottom of said receptacle and lying inside of the supporting base, said contact spears having their upper ends connected to the terminals of the electrical heating unit; and a non-combustible removable grid arranged over said electrical heating unit, said grid adapted to support the bulk of the material in the receptacle to prevent baking and permit a portion thereof to fall through the interstices of said grid to become ignited by said electrical heating unit.

3. A device of the character described comprising; a receptacle adapted to contain material to be burned; an electrical heating unit arranged in the bottom of said receptacle; a grid arranged over the heating unit and close thereto, said grid adapted to space the bulk of the material in the receptacle away from the electrical heating unit to prevent baking, and permit portions thereof to fall through the interstices to become ignited by said electrical heating unit.

4. A device of the character described comprising; a receptacle adapted to contain material to be burned; an electrical heating unit arranged in the bottom of said receptacle; a removable grid arranged over the electrical heating unit and close thereto, said grid adapted to allow a small portion of the material to be burned to fall through the interstices and become ignited by the electrical heating unit.

5. A device of the character described comprising; a receptacle adapted to contain material to be burned, said receptacle being provided with a supporting base; an electrical heating unit arranged in the bottom of said receptacle; a pair of contact spears projecting from the bottom of said receptacle and lying inside of the supporting base, said contact spears having their inner ends connected to the terminals of the electrical heating unit; a support for said receptacle; and an electric socket in said support adapted to receive the contact spears in readily removable manner when the receptacle rests on said support, said contact spears being entirely concealed by the supporting base of the receptacle when the same is resting on said support.

6. An incense burner comprising a receptacle adapted to receive incense, a support or base member adapted to support said receptacle, an electrical heating unit in said receptacle adapted to contact with the contained incense for the purpose of igniting same, and detachable electrical connections on said receptacle and said base member whereby the receptacle may be removably mounted on said base member in operative relation.

7. An incense burner comprising a receptacle adapted to receive incense, a base member adapted to support said receptacle, an electrical heating unit in said receptacle adapted to contact with the contained incense for the purpose of igniting same, a pair of contact spears connected to said heating element and extending downwardly below the plane of support of said receptacle, electrical members in said base member adapted to make contact with said contact spears in such manner that the receptacle may readily be removed from the base member, and a switch on said base member whereby an electrical current can be caused to flow through said heating element.

BERTRAM O. BRISCOE.